(12) United States Patent
Orta

(10) Patent No.: US 12,503,149 B1
(45) Date of Patent: Dec. 23, 2025

(54) GROUND TRANSPORT SLED

(71) Applicant: Michael Orta, Union City, NJ (US)

(72) Inventor: Michael Orta, Union City, NJ (US)

(*) Notice: Subject to any disclaimer, the term of this patent is extended or adjusted under 35 U.S.C. 154(b) by 119 days.

(21) Appl. No.: 18/483,774

(22) Filed: Oct. 10, 2023

(51) Int. Cl.
B62B 19/02 (2006.01)
B62B 13/06 (2006.01)

(52) U.S. Cl.
CPC .............. B62B 19/02 (2013.01); B62B 13/06 (2013.01); B62B 2202/90 (2013.01)

(58) Field of Classification Search
CPC ..... B62B 19/02; B62B 13/06; B62B 2202/90; B62B 1/20; B62B 13/18; B62B 19/00; B62K 13/00
See application file for complete search history.

(56) References Cited

U.S. PATENT DOCUMENTS

| | | | | |
|---|---|---|---|---|
| 183,576 A * | 10/1876 | Lee | ......................... | B62B 17/02 280/845 |
| 871,907 A * | 11/1907 | Bertram | .................. | B62B 13/06 280/845 |
| 2,523,950 A * | 9/1950 | Golubics | ................. | B62B 19/02 D12/6 |
| 4,310,169 A * | 1/1982 | Brough | .................... | A63C 5/03 280/14.1 |
| 4,653,763 A * | 3/1987 | Schulte | .................. | A63C 5/031 280/28.15 |
| D389,233 S | 1/1998 | Fehrn | | |
| D393,233 S | 4/1998 | Emanuel | | |
| 6,042,122 A * | 3/2000 | Mohr | ...................... | B62B 13/06 280/43.14 |
| 6,257,599 B1 | 7/2001 | Johnson | | |
| 9,540,029 B1 | 1/2017 | Farina | | |
| 10,099,713 B1 | 10/2018 | Hussey | | |
| 10,696,318 B2 | 6/2020 | Ruiz | | |
| 2006/0049588 A1* | 3/2006 | Twitchell | .............. | B62B 13/125 280/16 |
| 2021/0171084 A1 | 6/2021 | Bankhead | | |

FOREIGN PATENT DOCUMENTS

| | | | | |
|---|---|---|---|---|
| CA | 2914184 A1 * | 5/2016 | ............. | B60K 11/00 |
| FR | 2621548 A * | 4/1989 | ............. | B62B 19/02 |
| NO | 853484 L * | 3/1987 | | |
| WO | 2018172575 | 9/2018 | | |

OTHER PUBLICATIONS

NO-853484-L English Translation (Year: 1987).*
FR-2621548-A English Translation (Year: 1989).*
CA-2914184-A1 English Translation (Year: 2016).*

* cited by examiner

Primary Examiner — Michael T. Walsh

(57) ABSTRACT

The ground transport sled is configured for use on a bulk solid surface. The bulk solid surface is defined as a supporting surface formed from a bulk solid material. Examples of bulk solid surfaces include, but are not limited to, snow covered surfaces, sand surfaces, and gravel surfaces. The ground transport sled incorporates a plurality of runners, a plurality of cross members, a plurality of wagon tracks, and a cart structure. The ground transport sled forms a vehicle that carries the cart structure over the bulk solid surface. Each wagon track selected from the plurality of wagon tracks mounts on a runner selected from the plurality of runners. Each cross member selected from the plurality of cross member forms a bracing structure that stabilizes the plurality of runners.

10 Claims, 5 Drawing Sheets

GROUND TRANSPORT SLED

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of towed sledges. (B62B15/007)

SUMMARY OF INVENTION

The ground transport sled is a sled. The ground transport sled is configured for use on a bulk solid surface. The bulk solid surface is defined as a supporting surface formed from a bulk solid material. Examples of bulk solid surfaces include, but are not limited to, snow covered surfaces, sand surfaces, and gravel surfaces. The ground transport sled comprises a plurality of runners, a plurality of cross members, a plurality of wagon tracks, and a cart structure. The ground transport sled forms a vehicle that carries the cart structure over the bulk solid surface. Each wagon track selected from the plurality of wagon tracks mounts on a runner selected from the plurality of runners. Each cross member selected from the plurality of cross member forms a bracing structure that stabilizes the plurality of runners.

These together with additional objects, features and advantages of the ground transport sled will be readily apparent to those of ordinary skill in the art upon reading the following detailed description of the presently preferred, but nonetheless illustrative, embodiments when taken in conjunction with the accompanying drawings.

In this respect, before explaining the current embodiments of the ground transport sled in detail, it is to be understood that the ground transport sled is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ground transport sled.

It is therefore important that the claims be regarded as including such equivalent construction insofar as they do not depart from the spirit and scope of the ground transport sled. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
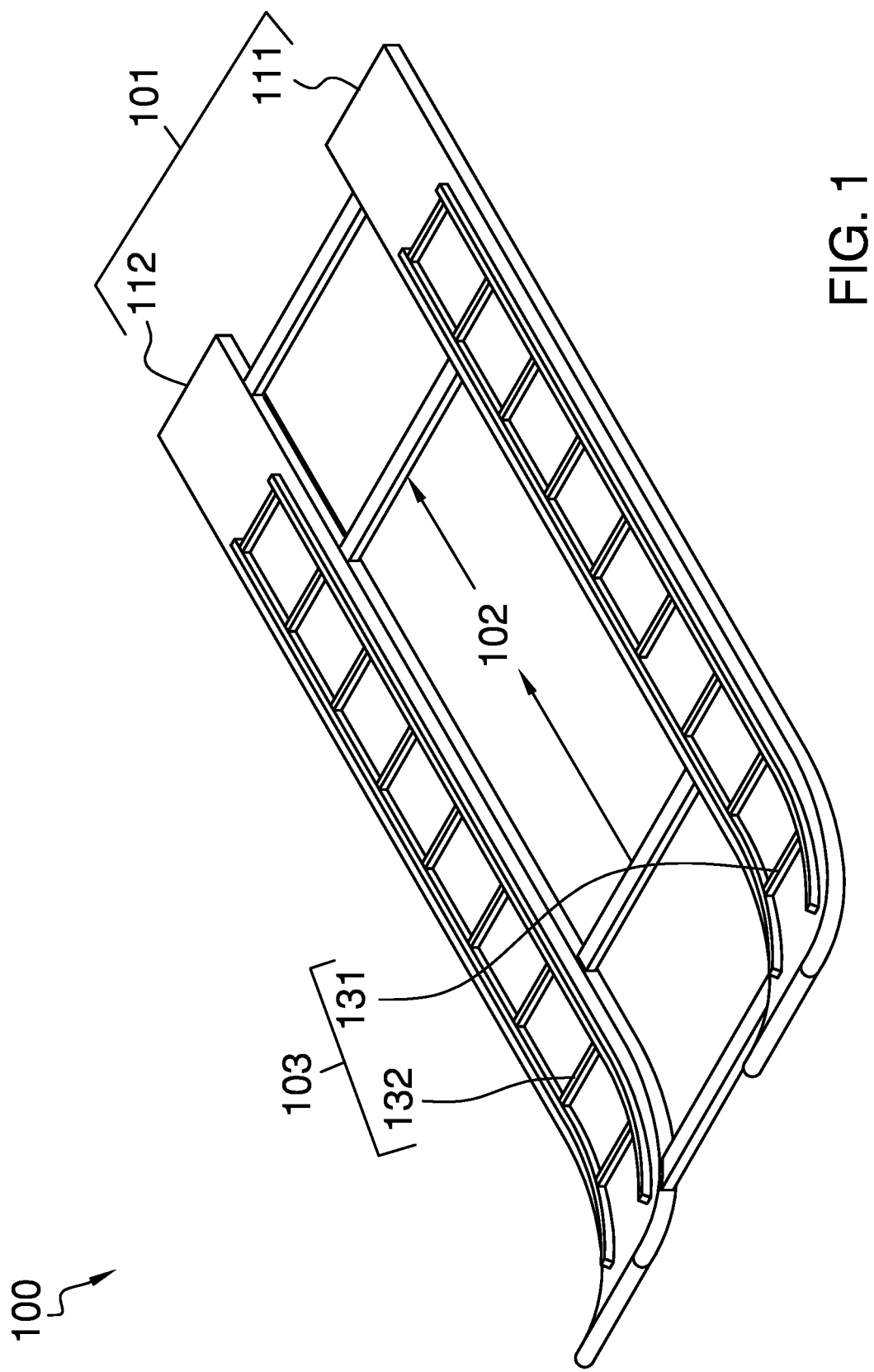
FIG. 1 is a perspective view of an embodiment of the disclosure.
Figure 2:
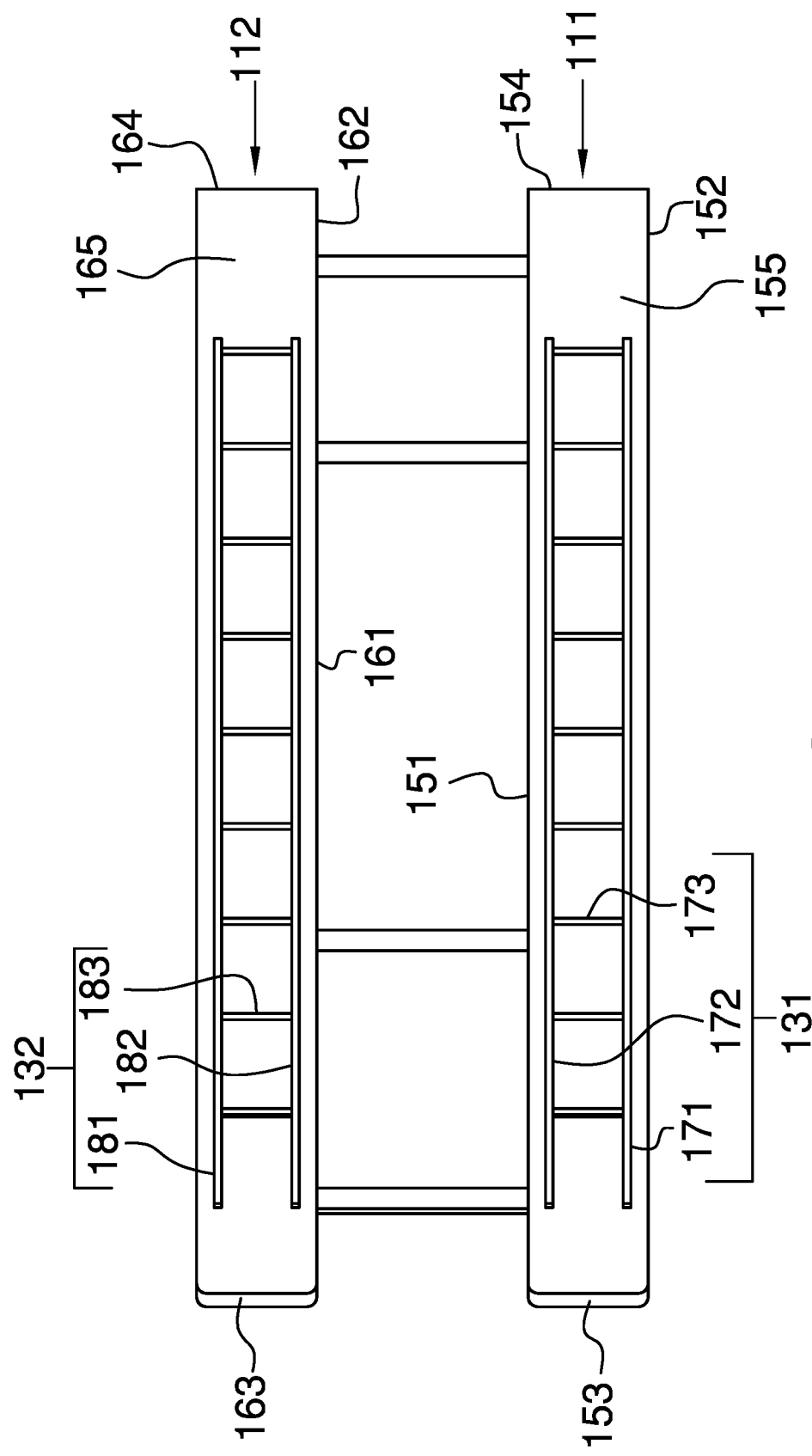
FIG. 2 is a top view of an embodiment of the disclosure.
Figure 3:
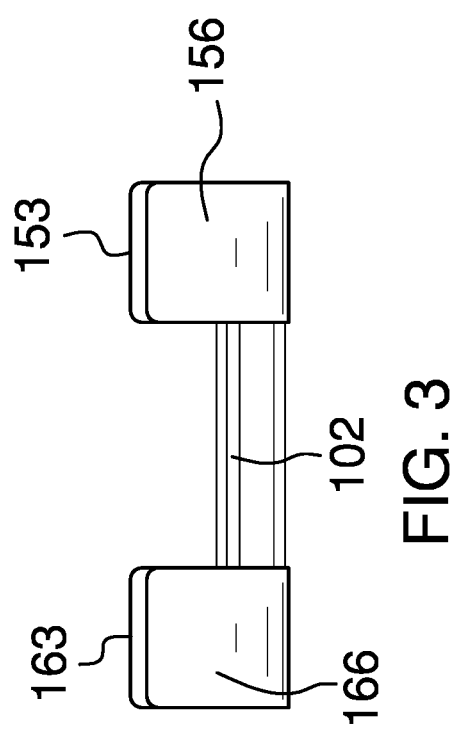
FIG. 3 is a front view of an embodiment of the disclosure.
Figure 4:
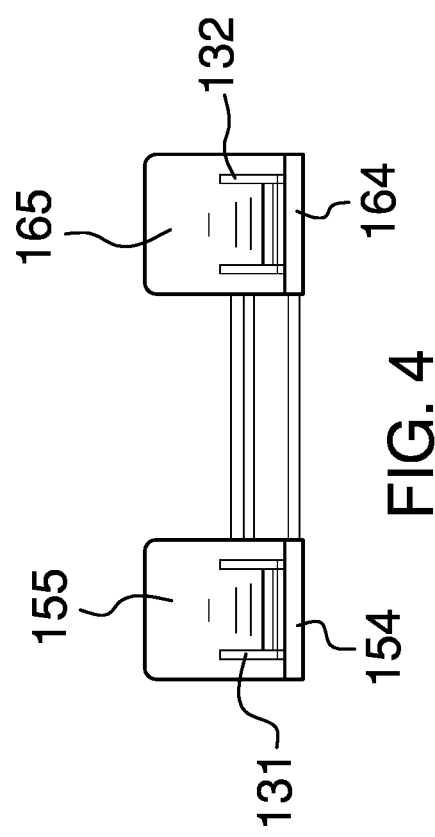
FIG. 4 is a rear view of an embodiment of the disclosure.
Figure 5:
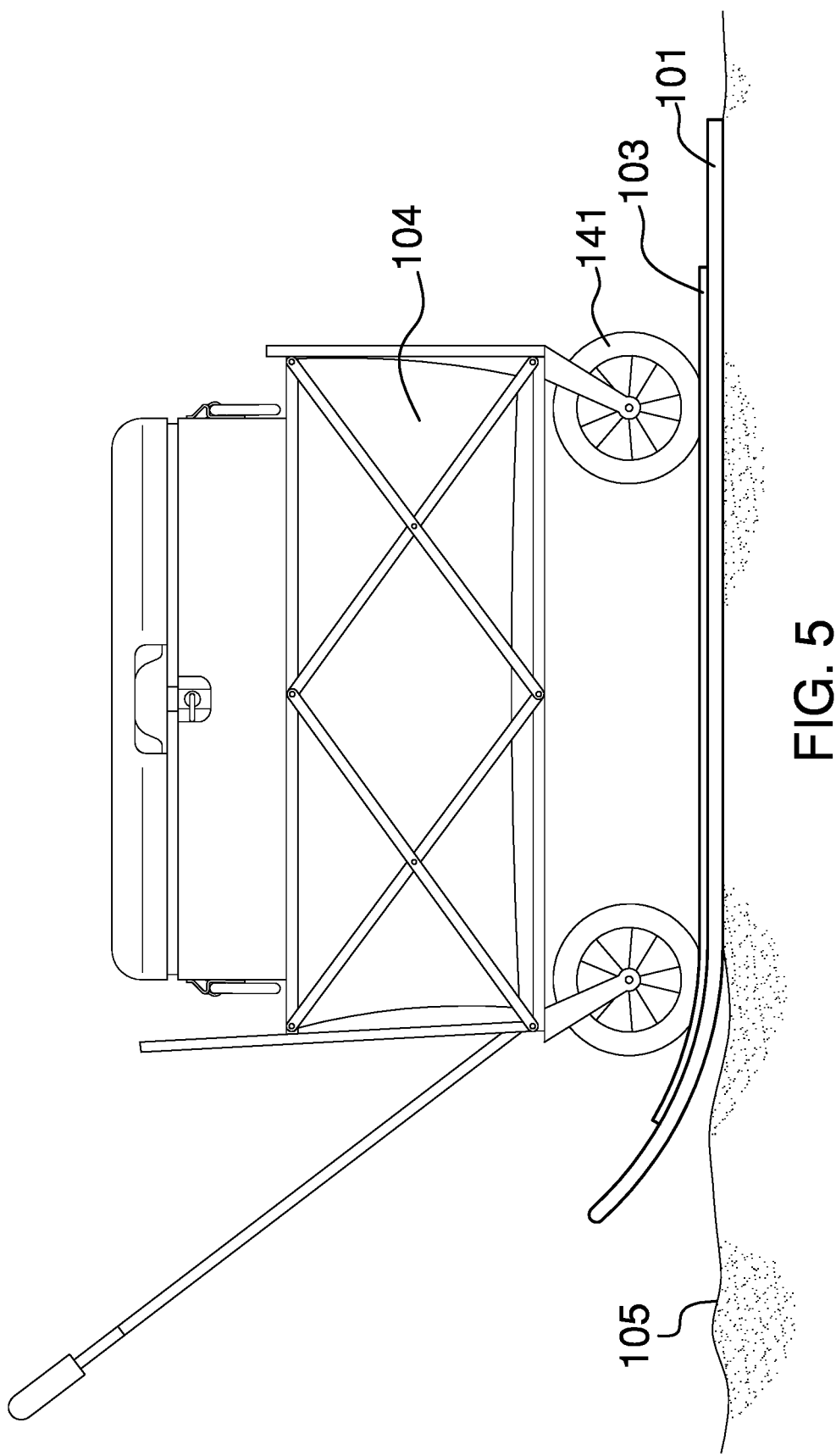
FIG. 5 is an in-use view of an embodiment of the disclosure.
Figure 6:
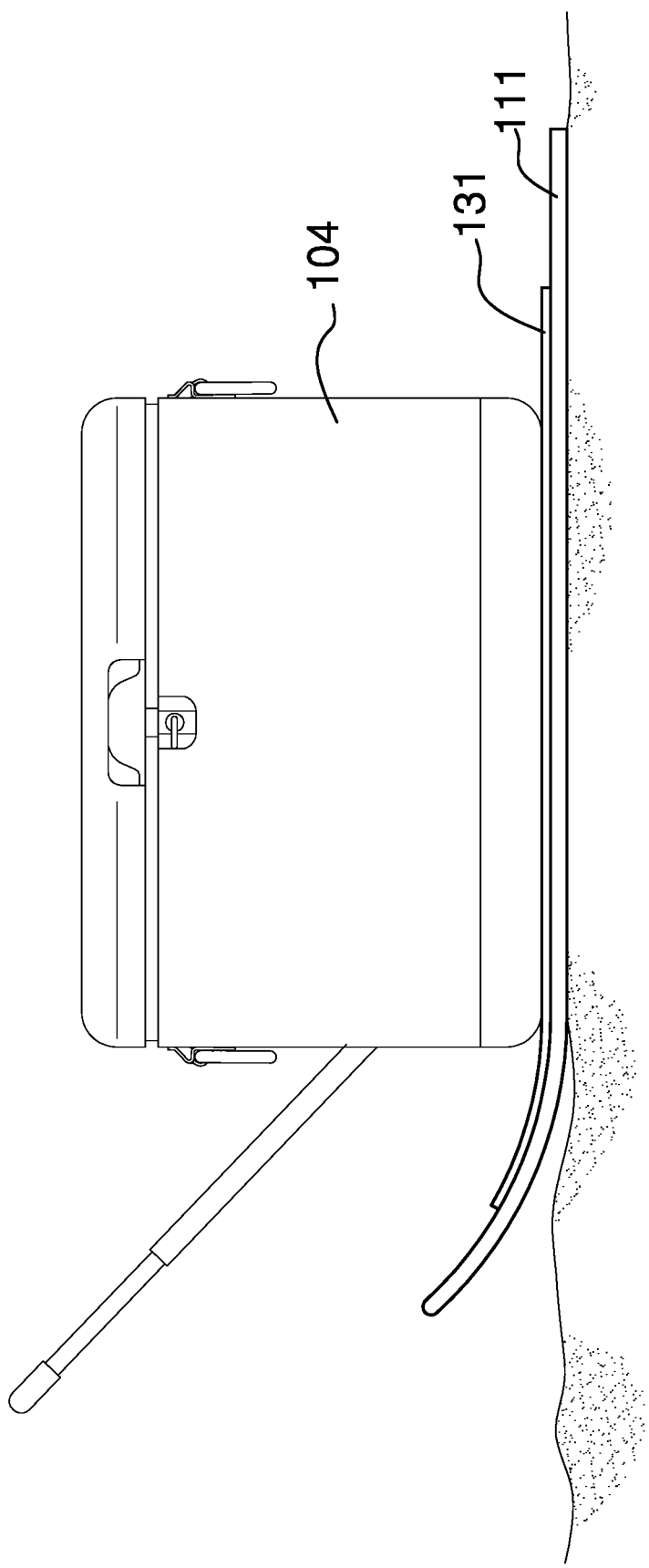
FIG. 6 is another in-use view of an embodiment of the disclosure.

Detailed reference will now be made to one or more potential embodiments of the disclosure, which are illustrated in FIGS. 1 through 6.

The ground transport sled 100 (hereinafter invention) is a sled. The invention 100 is configured for use on a bulk solid surface 105. The bulk solid surface 105 is defined as a supporting surface formed from a bulk solid material. Examples of bulk solid surfaces 105 include, but are not limited to, snow covered surfaces, sand surfaces, and gravel surfaces. The invention 100 is configured for use with a cart structure 104. The invention 100 comprises a plurality of runners 102, a plurality of cross members 102, a plurality of wagon tracks 103, and a cart structure 104. The invention 100 forms a vehicle that carries the cart structure 104 over the bulk solid surface 105. Each wagon track selected from the plurality of wagon tracks 103 mounts on a runner selected from the plurality of runners 102. Each cross member selected from the plurality of cross members 102 forms a bracing structure that stabilizes the plurality of runners 102.

The bulk solid surface 105 is the supporting surface over which the invention 100 slides. The bulk solid surface 105 is formed from a bulk solid material that is not suitable for supporting a wheeled cart.

The cart structure 104 is a cart. The cart structure 104 is a hand powered structure. The cart structure 104 is a wheeled structure. The cart structure 104 forms a vehicle that is used to carry cargo and passengers. During the use of the invention 100, the cart structure 104 rests on the plurality of runners 101 such that the plurality of wheels 141 of the cart 104 do not sink into the bulk solid surface 105 during transport. The cart structure 104 further comprises a plurality of wheels 141. The plurality of wheels 141 roll the cart structure 104 onto the plurality of runners 101. The plurality of wagon tracks 103 secures the plurality of wheels 141 into a fixed position for transport over the bulk solid surface 105.

The plurality of wheels 141 is a rolling structure. The plurality of wheels 141 forms a pedestal structure that elevates the cart structure 104 above a supporting surface. The plurality of wheels 141 forms a rotating structure that allows the cart structure 104 to roll over a solid supporting surface. The plurality of wheels 141 are not effective when used on a bulk solid surface 105.

The plurality of runners 101 form the pedestal structure of the invention 100. The plurality of runners 101 form a load bearing structure. The cart structure 104 rests on the superior surfaces of the plurality of runners 101. The plurality of runners 101 transfers the load of the cart structure 104 to the bulk solid surface 105. Each runner selected from the plurality of runners 101 is a non-Euclidean disk structure. The surface area of the inferior face of each selected runner is selected such that the mass of the cart structure 104 is distributed over a greater surface area than would be presented by the plurality of wheels 141 of the cart 104. Each selected runner allows the cart structure 104 to slide over the bulk solid surface 105. The plurality of runners 101 comprises a left runner 111 and a right runner 112.

The left runner 111 is a runner selected from the plurality of runners 101. The left runner 111 is a non-Euclidean disk structure. The left runner 111 forms a pedestal that transfers a portion of the load of the cart structure 104 to the bulk solid surface 105. The left runner 111 forms a portion of the structure of the plurality of runners 101 that slides over the bulk solid surface 105. The left runner 111 mounts on the left side of the invention 100. The left runner 111 comprises a left interior lateral face 151, a left exterior lateral face 152, a left anterior lateral face 153, a left posterior lateral face 154, a left superior surface 155, and a left inferior surface 156.

The left interior lateral face 151 is a lateral face of the non-Euclidean disk structure of the left runner 111. The left interior lateral face 151 is the lateral face of the left runner that is proximal to the right runner 112.

The left exterior lateral face 152 is a lateral face of the non-Euclidean disk structure of the left runner 111. The left exterior lateral face 152 is the lateral face of the left runner that is distal from the left interior lateral face 151.

The left anterior lateral face 153 is a lateral face of the non-Euclidean disk structure of the left runner 111. The left anterior lateral face 153 is the lateral face of the left runner 111 that leads the left runner 111 into the primary sense of direction of the invention 100.

The left posterior lateral face 154 is a lateral face of the non-Euclidean disk structure of the left runner 111. The left posterior lateral face 154 is the lateral face of the left runner 111 that is distal from the left anterior lateral face 153.

The left superior surface 155 forms a face of the non-Euclidean disk structure of the left runner 111. The left superior surface 155 is the face of the left runner 111 that is distal from the bulk solid surface 105. The left superior surface 155 forms a concave surface. The concave surface of the left superior surface 155 is directed such that the left anterior lateral face 153 is elevated above the bulk solid surface 105. A wagon track selected from the plurality of wagon tracks 103 mounts on the left superior surface 155.

The left inferior surface 156 forms a face of the non-Euclidean disk structure of the left runner 111. The left inferior surface 156 is the face of the left runner 111 that rests on the bulk solid surface 105. The left inferior surface forms a convex surface. The left inferior surface 156 is the face of the left runner 111 that is distal from the left superior surface 155. The concave surface of the left inferior surface 156 is directed such that the left anterior lateral face 153 is elevated above the bulk solid surface 105.

The right runner 112 is a runner selected from the plurality of runners 101. The right runner 112 is a non-Euclidean disk structure. The right runner 112 forms a pedestal that transfers a portion of the load of the cart structure 104 to the bulk solid surface 105. The right runner 112 forms a portion of the structure of the plurality of runners 101 that slides over the bulk solid surface 105. The right runner 112 mounts on the right side of the invention 100. The right runner 112 comprises a right interior lateral face 161, a right exterior lateral face 162, a right anterior lateral face 163, a right posterior lateral face 164, a right superior surface 165, and a right inferior surface 166.

The right interior lateral face 161 is a lateral face of the non-Euclidean disk structure of the right runner 112. The right interior lateral face 161 is the lateral face of the right runner 112 that is proximal to the left runner 111.

The right exterior lateral face 162 is a lateral face of the non-Euclidean disk structure of the right runner 112. The right exterior lateral face 162 is the lateral face of the right runner 112 that is distal from the right interior lateral face 161.

The right anterior lateral face 163 is a lateral face of the non-Euclidean disk structure of the right runner 112. The right anterior lateral face 163 is the lateral face of the right runner 112 that leads the right runner 112 into the primary sense of direction of the invention 100.

The right posterior lateral face 164 is a lateral face of the non-Euclidean disk structure of the right runner 112. The right posterior lateral face 164 is the lateral face of the right runner 112 that is distal from the right anterior lateral face 163.

The right superior surface 165 forms a face of the non-Euclidean disk structure of the right runner 112. The right superior surface 165 is the face of the right runner 112 that is distal from the bulk solid surface 105. The right superior surface 165 forms a concave surface. The concave surface of the right superior surface 165 is directed such that the right anterior lateral face 163 is elevated above the bulk solid surface 105. A wagon track selected from the plurality of wagon tracks 103 mounts on the right superior surface 165.

The right inferior surface 166 forms a face of the non-Euclidean disk structure of the right runner 112. The right inferior surface 166 is the face of the right runner 112 that rests on the bulk solid surface 105. The right inferior surface forms a convex surface. The right inferior surface 166 is the face of the right runner 112 that is distal from the right superior surface 165. The concave surface of the right inferior surface 166 is directed such that the right anterior lateral face 163 is elevated above the bulk solid surface 105.

Each cross member selected from the plurality of cross members 102 is a prism shaped structure. Each selected cross member is a rigid structure. Each selected cross member forms a brace. A first congruent end of each selected cross member permanently attaches to the left interior lateral face 151 of the left runner 111. The first congruent end of each selected cross member attaches to the left interior lateral face 151 such that the center axis of the selected cross member is perpendicular to the major axis of the left runner 111. A second congruent end of each selected cross member permanently attaches to the right interior lateral face 161 of the right runner 112. The second congruent end of each selected cross member attaches to the right interior lateral face 161 such that the center axis of the selected cross member is perpendicular to the major axis of the right runner 112. Each selected cross member forms a brace structure that distributes the energy receive from transient forces between the left runner 111 and the right runner 112.

Each wagon track selected from the plurality of wagon tracks 103 forms a framework. Each selected wagon track has a ladder like structure. Each selected wagon track forms a horizontally oriented structure. Each selected wagon track mounts on a structure selected from the group consisting of: a) the left superior surface 155 of the left runner 111; and, b) the right superior surface 165 of the right runner 112. Each selected wagon track forms a plurality of negative spaces. Each negative space formed by the selected wagon track is bounded by the rails and the rungs of the ladder structure. Each wheel selected from the plurality of wheels 141 of the cart 104 are sized such that each selected wheel fits within any selected negative space. Each negative space formed by the selected wagon track forms a structure that prevents a wheel selected from the plurality of wheels 141 from rolling along the associated selected runner while the cart structure 104 slides over the bulk solid surface 105. The plurality of wagon tracks 103 comprises a left wagon track 131 and a right wagon track 132.

The left wagon track 131 is a wagon track selected from the plurality of wagon tracks 103. The left wagon track 131 mounts on the left superior surface 155 of the left runner 111. The left wagon track 131 forms the structure that secures a subset of wheels selected from the plurality of wheels 141 of the cart to the left runner 111. The left wagon track 131 comprises a left exterior rail structure 171, a left interior rail structure 172, and a left plurality of rungs 173.

The left exterior rail structure 171 forms a rail of the ladder structure of the left wagon track 131. The left exterior rail structure 171 is a prism shaped structure. The left exterior rail structure 171 mounts on the left superior surface 155 of the left runner 111 such that the center axis of the left exterior rail structure 171 is parallel to the major axis of the left runner 111. The left exterior rail structure 171 is positioned between the left exterior lateral face 152 of the left runner 111 and the left interior rail structure 172.

The left interior rail structure 172 forms a rail of the ladder structure of the left wagon track 131. The left interior rail structure 172 is a prism shaped structure. The left interior rail structure 172 mounts on the left superior surface 155 of the left runner 111 such that the center axis of the left interior rail structure 172 is parallel to the major axis of the left runner 111. The left interior rail structure 172 is positioned between the left interior lateral face 151 of the left runner 111 and the left interior rail structure 172.

Each rung selected from the left plurality of rungs 173 forms a rung of the ladder structure of the left wagon track 131. Each rung selected from the left plurality of rungs 173 is a prism shaped structure. The center axis of each rung selected from the left plurality of rungs 173 is perpendicular to the major axis of the left runner 111. Each rung selected from the left plurality of rungs 173 attaches to the lateral face of the left exterior rail structure 171 such that the center axis of the selected rung is perpendicular to the center axis of the left exterior rail structure 171. Each rung selected from the left plurality of rungs 173 attaches to the lateral face of the left interior rail structure 172 such that the center axis of the selected rung is perpendicular to the center axis of the left interior rail structure 172.

The right wagon track 132 is a wagon track selected from the plurality of wagon tracks 103. The right wagon track 132 mounts on the right superior surface 165 of the right runner 112. The right wagon track 132 forms the structure that secures a subset of wheels selected from the plurality of wheels 141 of the cart 104 to the right runner 112. The right wagon track 132 comprises a right exterior rail structure 181, a right interior rail structure 182, and a right plurality of rungs 183.

The right exterior rail structure 181 forms a rail of the ladder structure of the right wagon track 132. The right exterior rail structure 181 is a prism shaped structure. The right exterior rail structure 181 mounts on the right superior surface 165 of the right runner 112 such that the center axis of the right exterior rail structure 181 is parallel to the major axis of the right runner 112. The right exterior rail structure 181 is positioned between the right exterior lateral face 162 of the right runner 112 and the right interior rail structure 182.

The right interior rail structure 182 forms a rail of the ladder structure of the right wagon track 132. The right interior rail structure 182 is a prism shaped structure. The right interior rail structure 182 mounts on the right superior surface 165 of the right runner 112 such that the center axis of the right interior rail structure 182 is parallel to the major axis of the right runner 112. The right interior rail structure 182 is positioned between the right interior lateral face 161 of the right runner 112 and the right interior rail structure 182.

Each rung selected from the right plurality of rungs 183 forms a rung of the ladder structure of the right wagon track 132. Each rung selected from the right plurality of rungs 183 is a prism shaped structure. The center axis of each rung selected from the right plurality of rungs 183 is perpendicular to the major axis of the right runner 112. Each rung selected from the right plurality of rungs 183 attaches to the lateral face of the right exterior rail structure 181 such that the center axis of the selected rung is perpendicular to the center axis of the right exterior rail structure 181. Each rung selected from the right plurality of rungs 183 attaches to the lateral face of the right interior rail structure 182 such that the center axis of the selected rung is perpendicular to the center axis of the right interior rail structure 182.

The following definitions were used in this disclosure:

Aft: As used in this disclosure, aft is term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Bow: As used in this disclosure, the bow refers to the anterior side of an object, vehicle, or vessel. Specifically, the bow refers to the structure that leads the object, vehicle, or vessel into the primary sense of direction of the object vehicle, or vessel.

Brace: As used in this disclosure, a brace is a rigid structural element that interconnects a first object with a second object to form a resulting object. The brace forms an energy transfer structure that transfers, distributes, and shares a force acting on the first object between the first object and the second object. The brace is used to support, stabilize, or otherwise steady an object.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Cant: As used in this disclosure, a cant is an angular deviation from one or more reference lines (or planes) such as a vertical line (or plane) or a horizontal line (or plane).

Cart: As used in this disclosure, a cart is small vehicle intended to be moved by a person. A synonym for cart is hand cart. A cart that is elevated above a supporting surface by one or more runners is called a sled.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles.

Framework: As used in this disclosure, a framework refers to a second object or structure that encloses a first object or structure.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Ladder: As used in this disclosure, a ladder is a climbing structure formed from rails and rungs used by an individual to change their elevation. The rails are joined by the rungs. The rungs are mounted horizontally. The rails provide the vertical support for the ladder. The rungs form the step structures used to change elevation.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis.

The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Openwork: As used in this disclosure, the term openwork is used to describe a structure, often a surface, which is formed with one or more openings that allow for visibility and fluid flow through the structure. Wrought work and meshes are forms of openwork.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Roughly: As used in this disclosure, roughly refers to a comparison between two objects. Roughly means that the difference between one or more parameters of the two compared objects are not significantly different.

Runner: As used in this disclosure, a runner is a disk shaped structure that: a) forms a pedestal that transfers a load to a surface; and, b) allows the supported load to slide over the surface. A snow ski and a water ski are examples of a runner.

Slide: As used in this disclosure, slide is a verb that refers to an object that is transported along a surface while in continuous contact with the surface. An object being transported along a surface with wheels cannot be said to be sliding. A slide over a short distance is referred to as a slip.

Space, Area, and Volume: As used in this disclosure, space refers to a multi-dimensional region (often two dimensional or three dimensional) within which: a) a directional structure can be established; b) a measure of distance can be established; and, c) the relative position between two or more objects can be established. The term area refers to a two dimensional space. An area, often called the surface area, is a measure of the size of an object in the two dimensional space. The term volume refers to a three dimensional space. A volume is a measure of the size of an object in the three dimensional space. The measure of the area and the volume are dependent on the measure of the distance and the directional structure of the associated space.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vehicle: As used in this disclosure, a vehicle is a motorized device that is used for transporting passengers, goods, or equipment. The term motorized vehicle refers to a vehicle can move under power provided by an electric motor or an internal combustion engine. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A ground transport sled comprising
a plurality of runners, a plurality of cross members, a plurality of wagon tracks, and a cart structure;
wherein each wagon track selected from the plurality of wagon tracks mounts on a runner selected from the plurality of runners;
wherein each cross member selected from the plurality of cross members forms a bracing structure that stabilizes the plurality of runners;
wherein each wagon track selected from the plurality of wagon tracks forms a framework;
wherein each selected wagon track has a ladder like structure;
wherein each selected wagon track forms a horizontally oriented structure;
wherein each selected wagon track mounts on a structure selected from the group consisting of: a) a left superior surface of a left runner; and, b) a right superior surface of a right runner;
wherein each selected wagon track forms a plurality of negative spaces;
wherein each negative space formed by the selected wagon track is bounded by rails and rungs of the ladder structure.

2. The ground transport sled according to claim 1
wherein the ground transport sled is a sled;
wherein the ground transport sled is configured for use on a bulk solid surface;
wherein the ground transport sled is configured for use with a cart structure;
wherein the ground transport sled forms a vehicle that carries the cart structure over the bulk solid surface.

3. The ground transport sled according to claim 2
wherein the plurality of runners form the pedestal structure of the ground transport sled;
wherein the plurality of runners form a load bearing structure;
wherein the cart structure rests on the superior surfaces of the plurality of runners;
wherein the plurality of runners transfers the load of the cart structure to the bulk solid surface;
wherein each runner selected from the plurality of runners is a non-Euclidean disk structure;
wherein each selected runner allows the cart structure to slide over the bulk solid surface.

4. The ground transport sled according to claim 3
wherein each selected cross member is a rigid structure;
wherein each selected cross member forms a brace;
wherein a first congruent end of each selected cross member permanently attaches to the left interior lateral face of the left runner;
wherein the first congruent end of each selected cross member attaches to the left interior lateral face such that the center axis of the selected cross member is perpendicular to the major axis of the left runner;
wherein a second congruent end of each selected cross member permanently attaches to the right interior lateral face of the right runner;
wherein the second congruent end of each selected cross member attaches to the right interior lateral face such that the center axis of the selected cross member is perpendicular to the major axis of the right runner;
wherein each selected cross member forms a brace structure that distributes the energy receive from transient forces between the left runner and the right runner.

5. The ground transport sled according to claim 4
wherein the plurality of runners comprises the left runner and the right runner;
wherein the left runner is a runner selected from the plurality of runners;
wherein the left runner is a non-Euclidean disk structure;
wherein the left runner forms a pedestal that transfers a portion of the load of the cart structure to the bulk solid surface;
wherein the left runner forms a portion of the structure of the plurality of runners that slides over the bulk solid surface;
wherein the left runner mounts on the left side of the ground transport sled;
wherein the right runner is a runner selected from the plurality of runners;
wherein the right runner is a non-Euclidean disk structure;
wherein the right runner forms a pedestal that transfers a portion of the load of the cart structure to the bulk solid surface;
wherein the right runner forms a portion of the structure of the plurality of runners that slides over the bulk solid surface;
wherein the right runner mounts on the right side of the ground transport sled.

6. The ground transport sled according to claim 5
wherein the plurality of wagon tracks comprises a left wagon track and a right wagon track;
wherein the left wagon track is a wagon track selected from the plurality of wagon tracks;
wherein the left wagon track mounts on the left runner;
wherein the right wagon track is a wagon track selected from the plurality of wagon tracks;
wherein the right wagon track mounts on the right runner.

7. The ground transport sled according to claim 6
wherein the left runner comprises a left interior lateral face, a left exterior lateral face, a left anterior lateral face, a left posterior lateral face, the left superior surface, and a left inferior surface;
wherein the left interior lateral face is a lateral face of the non-Euclidean disk structure of the left runner;
wherein the left interior lateral face is the lateral face of the left runner that is proximal to the right runner;
wherein the left exterior lateral face is a lateral face of the non-Euclidean disk structure of the left runner;
wherein the left exterior lateral face is the lateral face of the left runner that is distal from the left interior lateral face;
wherein the left anterior lateral face is a lateral face of the non-Euclidean disk structure of the left runner;
wherein the left anterior lateral face is the lateral face of the left runner that leads the left runner into the primary sense of direction of the ground transport sled;
wherein the left posterior lateral face is a lateral face of the non-Euclidean disk structure of the left runner;

wherein the left posterior lateral face is the lateral face of the left runner that is distal from the left anterior lateral face;

wherein the left superior surface forms a face of the non-Euclidean disk structure of the left runner;

wherein the left superior surface is the face of the left runner that is distal from the bulk solid surface;

wherein the left superior surface forms a concave surface;

wherein the concave surface of the left superior surface is directed such that the left anterior lateral face is elevated above the bulk solid surface;

wherein a wagon track selected from the plurality of wagon tracks mounts on the left superior surface;

wherein the left inferior surface forms a face of the non-Euclidean disk structure of the left runner;

wherein the left inferior surface is the face of the left runner that rests on the bulk solid surface;

wherein the left inferior surface forms a convex surface;

wherein the left inferior surface is the face of the left runner that is distal from the left superior surface;

wherein the concave surface of the left inferior surface is directed such that the left anterior lateral face is elevated above the bulk solid surface.

8. The ground transport sled according to claim 7
wherein the right runner comprises a right interior lateral face, a right exterior lateral face, a right anterior lateral face, a right posterior lateral face, the right superior surface, and a right inferior surface;

wherein the right interior lateral face is a lateral face of the non-Euclidean disk structure of the right runner;

wherein the right interior lateral face is the lateral face of the right runner that is proximal to the left runner;

wherein the right exterior lateral face is a lateral face of the non-Euclidean disk structure of the right runner;

wherein the right exterior lateral face is the lateral face of the right runner that is distal from the right interior lateral face;

wherein the right anterior lateral face is a lateral face of the non-Euclidean disk structure of the right runner;

wherein the right anterior lateral face is the lateral face of the right runner that leads the right runner into the primary sense of direction of the ground transport sled;

wherein the right posterior lateral face is a lateral face of the non-Euclidean disk structure of the right runner;

wherein the right posterior lateral face is the lateral face of the right runner that is distal from the right anterior lateral face;

wherein the right superior surface forms a face of the non-Euclidean disk structure of the right runner;

wherein the right superior surface is the face of the right runner that is distal from the bulk solid surface;

wherein the right superior surface forms a concave surface;

wherein the concave surface of the right superior surface is directed such that the right anterior lateral face is elevated above the bulk solid surface;

wherein a wagon track selected from the plurality of wagon tracks mounts on the right superior surface;

wherein the right inferior surface forms a face of the non-Euclidean disk structure of the right runner;

wherein the right inferior surface is the face of the right runner that rests on the bulk solid surface;

wherein the right inferior surface forms a convex surface;

wherein the right inferior surface is the face of the right runner that is distal from the right superior surface;

wherein the concave surface of the right inferior surface is directed such that the right anterior lateral face is elevated above the bulk solid surface.

9. The ground transport sled according to claim 8
wherein the left wagon track comprises a left exterior rail structure, a left interior rail structure, and a left plurality of rungs;

wherein the left exterior rail structure forms a rail of the ladder structure of the left wagon track;

wherein the left exterior rail structure mounts on the left superior surface of the left runner such that the center axis of the left exterior rail structure is parallel to the major axis of the left runner;

wherein the left exterior rail structure is positioned between the left exterior lateral face of the left runner and the left interior rail structure;

wherein the left interior rail structure forms a rail of the ladder structure of the left wagon track;

wherein the left interior rail structure mounts on the left superior surface of the left runner such that the center axis of the left interior rail structure is parallel to the major axis of the left runner;

wherein the left interior rail structure is positioned between the left interior lateral face of the left runner and the left interior rail structure;

wherein each rung selected from the left plurality of rungs forms a rung of the ladder structure of the left wagon track;

wherein the center axis of each rung selected from the left plurality of rungs is perpendicular to the major axis of the left runner;

wherein each rung selected from the left plurality of rungs attaches to the lateral face of the left exterior rail structure such that the center axis of the selected rung is perpendicular to the center axis of the left exterior rail structure;

wherein each rung selected from the left plurality of rungs attaches to the lateral face of the left interior rail structure such that the center axis of the selected rung is perpendicular to the center axis of the left interior rail structure.

10. The ground transport sled according to claim 9
wherein the right wagon track comprises a right exterior rail structure, a right interior rail structure, and a right plurality of rungs;

wherein the right exterior rail structure forms a rail of the ladder structure of the right wagon track;

wherein the right exterior rail structure mounts on the right superior surface of the right runner such that the center axis of the right exterior rail structure is parallel to the major axis of the right runner;

wherein the right exterior rail structure is positioned between the right exterior lateral face of the right runner and the right interior rail structure;

wherein the right interior rail structure forms a rail of the ladder structure of the right wagon track;

wherein the right interior rail structure mounts on the right superior surface of the right runner such that the center axis of the right interior rail structure is parallel to the major axis of the right runner;

wherein the right interior rail structure is positioned between the right interior lateral face of the right runner and the right interior rail structure;

wherein each rung selected from the right plurality of rungs forms a rung of the ladder structure of the right wagon track;

wherein the center axis of each rung selected from the right plurality of rungs is perpendicular to the major axis of the right runner;

wherein each rung selected from the right plurality of rungs attaches to the lateral face of the right exterior rail structure such that the center axis of the selected rung is perpendicular to the center axis of the right exterior rail structure;

wherein each rung selected from the right plurality of rungs attaches to the lateral face of the right interior rail structure such that the center axis of the selected rung is perpendicular to the center axis of the right interior rail structure.

\* \* \* \* \*